United States Patent [19]
Sugier et al.

[11] Patent Number: 4,973,775
[45] Date of Patent: Nov. 27, 1990

[54] PROCESS FOR DELAYING THE FORMATION AND/OR REDUCING THE AGGLOMERATION TENDENCY OF HYDRATES

[75] Inventors: André Sugier; Paul Bourgmayer, both of Rueil Malmaison; Robert Stern, Paris, all of France

[73] Assignee: Institut Francais du Petrole, Rueil Malmaison, France

[21] Appl. No.: 292,351

[22] Filed: Dec. 30, 1988

[30] Foreign Application Priority Data

Dec. 30, 1987 [FR] France ............................... 87 18436

[51] Int. Cl.$^5$ .............................................. C07C 7/20
[52] U.S. Cl. ......................................... 585/15; 55/29; 55/30; 55/68; 585/950
[58] Field of Search ...................... 585/15, 950; 55/29, 55/30, 68

[56] References Cited

U.S. PATENT DOCUMENTS

| | | | |
|---|---|---|---|
| 2,410,583 | 11/1946 | Huchinson | 585/15 |
| 3,096,383 | 7/1963 | Hann | 585/15 |
| 3,213,593 | 10/1965 | Hendrix | 585/15 |
| 3,857,686 | 12/1974 | Arnold et al. | 55/29 |

FOREIGN PATENT DOCUMENTS 4135708 4/1978 Japan ..................... 585/15

Primary Examiner—Asok Pal
Attorney, Agent, or Firm—Antonelli, Terry, Stout & Kraus

[57] ABSTRACT

The invention concerns a process for delaying the formation and/or reducing the agglomeration tendency of hydrates in conditions under which a hydrate may be formed, these hydrates being formed from water and gas. The process according to the invention wherein, in particular, an additive comprising at least one compound from the group of hydroxycarbylamides of substituted carboxylic acids is used. Application of the process according to the invention to processes using gases and water, which form hydrates between them, in particular in the petroleum or gas industry.

14 Claims, 1 Drawing Sheet

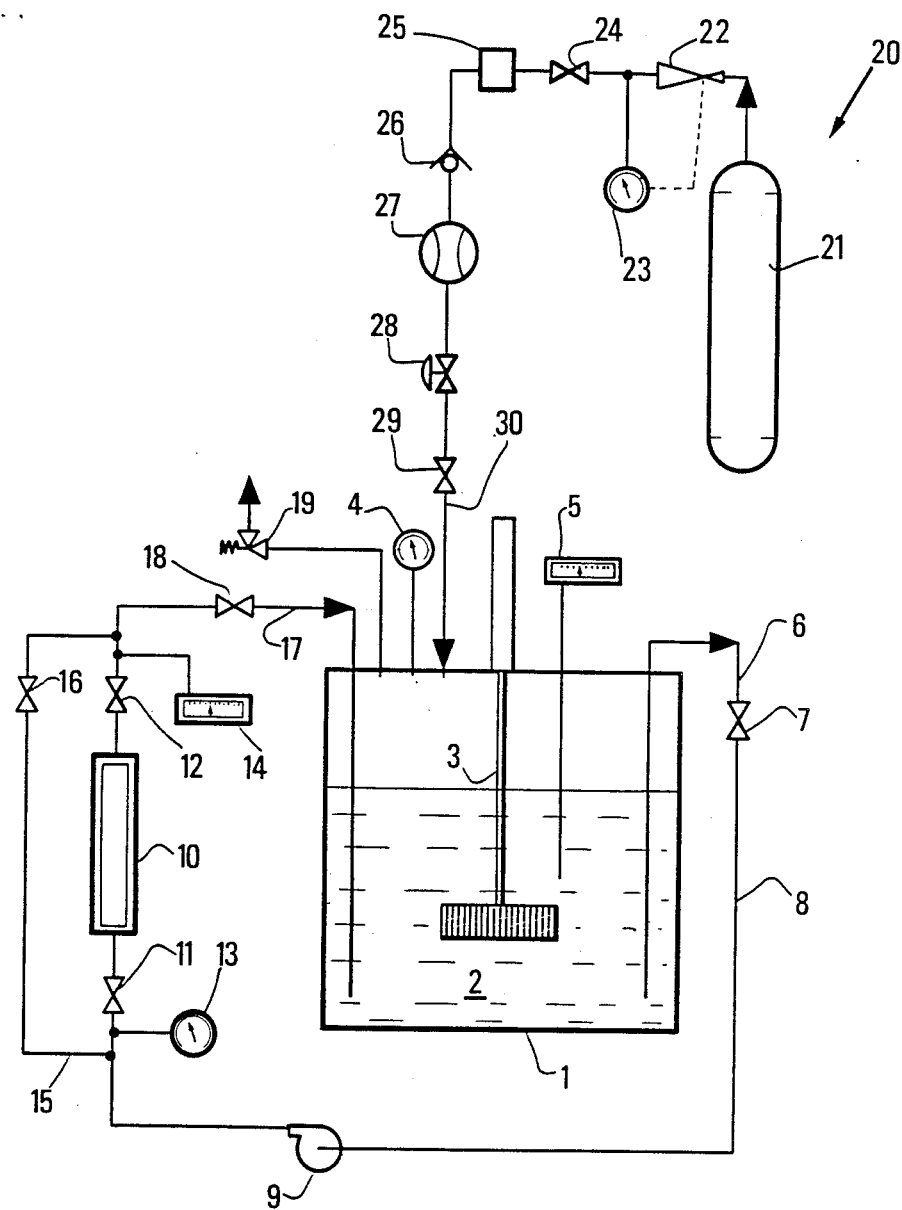

PROCESS FOR DELAYING THE FORMATION AND/OR REDUCING THE AGGLOMERATION TENDENCY OF HYDRATES

The invention concerns a process for delaying the formation and/or reducing the agglomeration tendency of hydrates of natural gas, petroleum gas or other gases by use of at least one additive. The gases which form hydrates can notably comprise, for example, methane, ethane, ethylene, propane, propene, n-butane, i-butane, $H_2S$ and/or $CO_2$.

These hydrates are formed when water is found in the presence of gas, either in the free state or dissolved in a liquid phase, such as a liquid hydrocarbon, and when the temperature reached by a mixture of, in particular, water, gas and possibly liquid hydrocarbons such as an oil is below the thermodynamic formation temperature of hydrates, this temperature corresponding to a known acomposition of gases whose pressure is fixed.

The formation of hydrates is extremely troublesome, particularly in the petroleum and gas industry where the conditions for formation of hydrates may be combined. In fact, in order to reduce the cost of producing crude oil and gas, in terms of investments and operating costs, one solution envisaged, in the case of offshore production in particular, is to reduce, or even to suppress, the processes applied to the crude or to the gas to be transported from the field to the coast and, in particular, to leave some or all of the water in the fluid transported. These offshore processes are generally effected on a platform situated on the surface near a field, in a way such that the initially hot effluent can be treated before thermodynamic conditions favorable for the formation of hydrates are reached due to cooling of the effluent by seawater.

However, in practice, when the thermodynamic conditions required for formation of the hydrates are combined, agglomeration of the hydrates leads to filling and blocking of feeders by creating blockages which prevent all passage of crude petroleum or gas.

The formation of hydrate blockages may lead to a standstill in offshore production and thus incur major financial losses. Furthermore, restarting of the installation, especially in the case of offshore production or transport, can be a lengthy process as decomposition of the hydrates formed is not easy to carry out. In fact, when the output of an underwater field of natural-gas or petroleum and gas containing water reaches the surface of the seabed and is then transported along the seabed, thermodynamic conditions are often combined for the formation of hydrates, due a decrease in the temperature of the effluent produced, which then agglomerate and block the transfer line. The temperature at the seabed can be, for example, 3° or 4° C.

Conditions favoring the formation of hydrates can be combined in the same way on land, in lines that are not buried at all or are not sufficiently buried in the ground, when for example, the temperature of ambient air is cold.

To avoid these inconveniences, we proceed either to addition of inhibitors which reduce the thermodynamic formation temperature of hydrates or to insulation feeders in such a way as to avoid the temperature of the fluid transported reaching the temperature for formation of hydrates in the operating conditions in use.

These two solutions are very costly as, in the first case, the quantity of formation inhibitors added, the most currently used being methanol and ethylene glycol, can be up to 10 to 20% of content in water and these inhibitors are difficult to recover completely. As for the second solution, insulation of the line is also very costly.

It has been discovered that certain additives, which up to the present have not been used to this end, show great efficiency in reducing the formation temperature of hydrates and/or modifying the mechanism of formation of these hydrates as, instead of rapidly agglomerating to each other and forming solid blockages, the hydrates formed disperse in the fluid without agglomerating and obstructing the lines, as long as the temperature of the fluid transported is not too low.

Use of these additives is particularly advantageous from the economic point of view as the quantities used are very low (less than 0.5% in weight with respect to water) and the cost of the additives is moderate.

The additives used according to the invention, alone or in combination or possibly in the presence of other compounds (methanol, glycol, surfactant(s)), to delay the formation and/or reduce the agglomeration tendency of hydrates in conditions under which a hydrate may be formed, comprise amphiphilic compounds, notably non-ionic amphiphilic compounds or amphiphilic compounds including an amide group.

By amphiphilic compounds, we mean compounds comprising a hydrophilic or polar part and an oleophilic or lipophilic part.

Non-ionic amphiphilic compounds are characterized by comprising:

a hydrophilic part comprising alkylene oxide, hydroxyl or alkylene amine groups, an oleophilic part comprising a hydrocarbon chain derived from an alcohol, a fatty acid, an alkylated derivative of phenol or an isobutene- or butene-based polyolefin, and a bond between the hydrophilic and oleophilic parts which can be, for example, an ether, ester or amide bridge. The bond can also be obtained from a nitrogen or sulfur atom.

Among the non-ionic amphiphilic compounds with an ether bridge, oxyethylated fatty alcohols, oxyethylated alkylphenols, oxyethylated and/or oxypropylated derivatives and ethers of sugars can be cited.

The amphiphilic compounds used according to the invention are preferably amide compounds. Very interesting results have been obtained with hydroxylated amide compounds, notably carbylamides of substituted or unsubstituted carboxylic acids, carbylamides of amino acids such as peptides, or with sulfonic acid amides, said amides being used in a proportion from 100 to 50,000 ppm in weight with respect to the water which forms hydrates with the gas.

These hydroxycarbylamides can be manufactured from fatty acids, esters of these fatty acids, vegetable or animal oils and fats or even anhydrides of acids, in which, for example, the first acid function forms an amide and the second is, for example, an ester of a long chain alcohol, by reacting these bodies with hydroxycarbylamines such as diethanolamine or monoethanolamine.

By "hydroxycarbyl", we mean a hydrocarbyl substituted by at least one hydroxy group.

The product obtained comprises a major proportion of hydroxycarbylamides but can also contain by-products such as esteramides or amine esters frequently present even in commercial products.

Thus, according to H. Maag, JAOCS, 61,260 (1984), a typical hydroxycarbylamide composition manufactured from a fatty acid and excess diethanolamine comprises only 65% of fatty acid diethanolamide, 22% of free diethanolamine, 10% of fatty acid amine salts and 1% of ester amides.

By way of comparison, an amide manufactured from a methyl ester of the same fatty acid comprises over 90% of diethanolamide.

Similarly, vegetable oils or animals fats provide mono or diglycerides which can confer beneficial emulsifying properties.

Another method to obtain hydroxycarbylamides consists of ethoxylating fatty acid amides.

Among the hydroxycarbylamides and polyhydroxycarbylamides, the following formulae can be given:

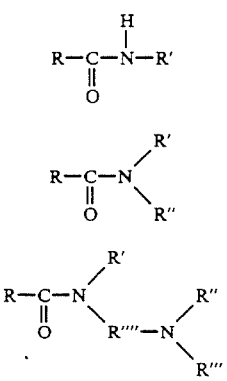

in which:
R—C=O is a radical of the carboxylic acid and comprises 4 to 28 carbon atoms, the R radical having the possibility of being substituted.
R' R" and R''' are hydroxycarbyl radicals and R'''' is an alkylenic radical of the type $C_nH_{2n}$, n is a whole number equal to at least 1.

These carboxylic acids may be saturated or unsaturated, linear carboxylic acids, for example, such as the following acids:

butyric (C4:0), caproic (C6:0), caprylic (C8:0), capric (C10:0), lauric (C12:0), myristic (C14:0), palmitic (C16:0), stearic (C18:0), arachidic (C20:0), behenic (C22:0), lignoceric (C24:0) corresponding to acids with an even number of carbon atoms (4 to 24); and the following unsaturated acids: palmitoleic (C16:1), elaidic (C18:1t), oleic (C18:1c), linoleic (C18:2), linolenic (C18:3), gadoleic (C20:1), erucic (C22:1).

For each of the acids mentioned above, in addition to the number of carbon atoms, the number of ethylenic insaturations is indicated. Further, C signifies Cis and t trans.

These saturated and unsaturated acids are generally present as such or in mixture in bonded form in oils, esters, in fatty acid mixtures used as a raw material for amides.

The most commonly used oils are, for example, peanut, old and new rapeseed, coconut, cotton seed, wheat-germ, maize, olive, palm, palmnut, soybean, suet, lard, sunflower, butter, safflower, tall-oil (resinous extract), fish and karite.

The carboxylic acids of amides may be hydroxycarboxylic acids such as ricinoleic or hydroxystearic acid, derived from castor oil or hydrogenated castor oil.

The carboxylic acids may be epoxycarboxylic acids, such as epoxystearic acid, or mixtures derived from epoxidated oils.

The carboxylic acids may be in the form of polymers such as estolized acids obtained, for example, from castor oil and for which the formula is:

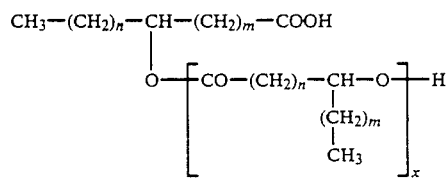

in which $1 \leq x \leq 20$ and $n+m=15$.

The carboxylic acids may be diacids or triacids corresponding to dimers and trimers of fatty acids or to dicarboxylic acids such as dodecanedioic acid in which one of the acid functions can be free, a dimer acid of a fatty acid such as dimerized oleic acid, or a low molecular weight acid such as succinic acid, substituted in position 2 by an isobutene-type polymeric group.

The carboxylic acids may be nonlinear acids such as abietic acid.

The carboxylic acid may undecylenic acid.

The carboxylic acid may be an alkenylsuccinic acid and the anhydride may be an alkenylsuccinic anhydride. The alkenyl group of the acid or anhydride may be derived from a polymer or oligomer of a monoolefin containing 2 to 5 carbon atoms.

This polymer may be a polyisobutene in which the alkenyl group (for example polyisobutenyl) has an average molecular weight from 300 to 5000.

The amines used, in combination with the carboxylic acids, to carry out synthesis of amides and having the formula $NH_2R'$ or $NHR'R''$ in which R' and R" are defined as hereinabove, are, for example, alkanolamines such as:

monoethanolamine: $OH-(CH_2)_2-NH_2$,
monopropanolamine: $OH-(CH_2)_3-NH_2$,
monoisopropanolamine: $CH_3-CH(OH)-CH_2-NH_2$,
2-amino-1-butanol: $CH_3-CH_2-CH(NH_2)-CH_2-OH$,
1-amino-2-butanol: $CH_3-CH_2-CH(OH)-CH_2-NH_2$,
N methylethanolamine: $CH_3-NH-(CH_2)_2-OH$,
N butylethanolamine: $CH_3-(CH_2)_3-NH-(CH_2)_2-OH$,
pentanolamine, hexanolamine, cyclohexanolamine, polyalkanolamines or even polyalkoxyglycolamines of formula: $OH-(CH_2-CH_2O)_n-CH_2-CH_2-NH_2$
and animated diols such as:
diethanolamine $(OH-CH_2-CH_2)_2NH$,
diisopropanolamine $(CH_3-CH(OH)-CH_2)_2-NH$, or trihydroxymethylaminomethane $(OH-CH_2)_3-C-NH_2$.

More particularly, these hydroxycarbylamides may be one of the monohydroxycarbylamides or N,N-dihydroxycarbylamides of carboxylic acids.

The hydroxyamides may be aliphatic or cyclic. The amides may be mono or diethanolamides of carboxylic acids and may comprise 3 to 36 carbon atoms and preferably 8 to 20 carbon atoms. These mono and diethanolamides can be respectively represented by the following formulae:

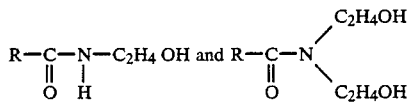

in which

is a radical of the carboxylic acid, R being as defined hereinabove.

The amides may be mono or polyoxyalkylated, for example such as mono and ethoxylated diethanolamides whose ethoxylation ratio is from 1 to 20.

Synthesis of amides according to formula 3 can be obtained by reacting excess alkanolamine, such as diethanolamine, with a fatty acid, R'''' representing here $(CH_2)_2$.

The hydrocarbylamides can be obtained by reacting an amino acid, such as a peptide, with an acid chloride or anhydride then by carrying out esterification or amidation.

The amino acids can be obtained for example from cutting of a yeast, from protein of soybean cake, or rapeseed, from a fermentation product or gelatin (bones).

The amides of amino acids can be advantageously alkoxylated.

The hydroxycarbylamides of sulfonic acids are preferably alkanolamides and the sulfonic acids can be arylsulfonic acids, such as dodecylbenzene sulfonic acid, or alkylsulfonic acids.

When water is mixed with a petroleum effluent comprising gas and oil and having a gas-oil ratio GOR less than 400, and when the water is likely to form hydrates with the gas, the compound can be added to the water and/or the petroleum effluent in a proportion between 50 and 50,000 ppm in weight with respect to the weight of water and, preferably, in a proportion between 100 and 5000 ppm. The additive may comprise an alcohol, such as methanol or pentanol, in addition to said compound.

The additive may also comprise a surfactant compound, this surfactant compound preferably being anionic.

The following examples illustrate the invention without in any way limiting it. Examples 1 and 2 are given as comparisons.

In these examples, tests on the formation of hydrates from gas, condensate and water were carried out in order to estimate the efficiency of the additives, using the apparatus represented in the attached diagram.

BRIEF DESCRIPTION OF DRAWINGS

The apparatus consists of a thermoregulated reactor 1 with a volume of 2 liters in which a liquid 2, such as a mixture of condensate and water, is placed and which is continuously stirred with a stirrer 3 attached to one end of a turbine. Supply of gas to reactor 1 is regulated with a pressure gage 4, the temperature of the reactor and the circulation loop is controlled with constant-temperature water baths whose temperature is regulated with a temperature probe 5. A pipe 6 with one end immersed in the liquid 1 supplies, with its other end, a circulation loop 8 which can be shut off with a valve 7.

A pump 9 ensuring circulation of the fluid and gas is attached to the circulation loop 8. The loop 8 also includes an observation chamber 10, isolable by two valves 11 and 12, in which formation of hydrates can be observed.

Above and below this chamber, a pressure indicator 13 and a temperature indicator 14 are found. The apparatus includes a junction 15 from the observation chamber, this junction being equipped with a guard valve 16.

The fluid and gas, having gone through the observation chamber 10 or the junction 15, return to the reactor via a runback loop 17. A valve 18 allows the runback circuit to be isolated. The reactor 1 also includes a safety valve 19.

Supply of gas to the reactor 1 is carried out with a circuit, designated 20 as a whole and which includes the following elements, assembled one after the other: a gas reservoir 21, a pressure reducer 22, a fixed pressure gage 23 controlling the pressure reducer 22, a shutoff valve 24, a filter 25, a check valve 26, a flowmeter 27, an electronic valve 28, controlled by the pressure gage 4 and ensuring fixed pressure within the reactor by modification of gas flow, a guard valve 29 and a supply loop 30 penetrating into the reactor.

In a practical example, the circulation loop 8 is 10 meters long and is in the form of a tube with an internal diameter of about 19 mm ($\frac{3}{4}$"). The circulation pump 9 allows flow-rates up to 1 m/s.

The formation of hydrates by reaction of gas with water can be seen from the consumption of gas which is determined by the flowmeter 27 and which is controlled by the electronic valve 28 and the differential pressure gage 23, in a way such that the pressure is kept constant in the circuit to plus or minus 1/50th of a bar.

In order to determine the temperature at which hydrates are formed, a rapid decrease in temperature of 3° C. per hour is effected from ambient temperature to 1° C.

Having noted the temperature at which hydrates are formed, seen by a consumption of gases, we increase the temperature of the reactor and circulation loop to 5° C. above this formation temperature and wait until decomposition of hydrates is complete. This decomposition is revealed by an increase in pressure in the reactor 1 and by the visual disappearance of the opacity of the fluid, produced by the presence of hydrates.

Finally, a slow decrease in temperature, in the order of 1° C./hour, is effected and the temperature at which hydrates begin to form is determined, then the temperature at which the circuit is completely blocked and no circulation of the fluid is possible is determined.

EXAMPLE n° 1

In this example, we work with a fluid consisting of 20% in volume of water and 80% in volume of condensate. The condensate weight composition is: for molecules having less than 11 carbon atoms: 20% of paraffins and isoparaffins, 48% of naphthenes, 10% of aromatics; and for molecules having at least 11 carbon atoms: 22% of a mixture of paraffins, isoparaffins, naphthenes and aromatics. The gas used comprises 98% in volume of methane and 2% in volume of ethane.

Experimentation is carried out under a pressure of 7MPa, kept constant by supplying the gas.

Under these conditions, the temperature at which hydrates start to form, during the second decrease in temperature, is 11.4° C. and blockage of circulation by increase and coalescence of hydrates occurs when the temperature reaches +11° C. (284K), that is, 24 minutes after the hydrates start to form.

EXAMPLE n° 2

In this example, we proceed as in example n° 1 with the same fluid, gas and pressure but we add to the circulating fluid 5% in weight of methanol with respect to the water in the mixture. Under these conditions, we observe that the temperature at which hydrates start to form is 9.4° C. and that the temperature at which no circulation of fluid is possible is 9° C.

EXAMPLE n° 3

We proceed as in example n° 1 but we add to the circulating fluid 0.1% in weight of coconut diethanolamides with respect to water. A typical composition of the acids present in coconut oil is as follows:
1.2% hexanoic (C6),
9.7% octanoic (C8),
6.3% decanoic (C10),
45.5% dodecanoic (C12),
18.2% tetradecanoic (C14),
8.7% hexadecanoic (C16),
1.8% octadecanoic (C18),
6.9% octadecenoic (C18:1),
1.7% linoleic (C18:2).

Under these conditions, we observe that the temperature at which hydrates start to form is +9° C. and that blocking of fluid circulation occurs at −4° C.

EXAMPLE 3a

We proceed as in example n° 3 but maintain the temperature at −2° C. Circulation of the fluid is stopped and then the pump is restarted every hour in order to determine whether the circuit is blocked. Under these conditions, we observe that at the end of 8 hours at −2° C., the circuit is blocked.

EXAMPLE n° 4

We proceed as in example n° 3 but we add to the circulating fluid 0.25% in weight of coconut diethanolamides with respect to water. Under these conditions, we observe that the temperature at which hydrates start to form is 7.5° C. and that no blocking of fluid circulation was observed at −10° C., the lowest temperature at which we carried out the experimentation.

EXAMPLE n° 4a

We proceed as in example n° 4 with 25% in weight of coconut diethanolamides, but once a temperature of −2° C. is reached, temperature at which there is no blockage, fluid circulation is stopped and at the end of one hour, the pump is restarted for 2 minutes in order to see if there is blockage. Under these conditions, we observe that at the end of 24 hours at −2° C., no blockage is produced and that each time the pump is restarted, every hour, circulation of the fluid containing hydrates proceeds normally.

EXAMPLE n° 5

We proceed as in example n° 1 but we add to the circulating fluid 0.1% in weight of ethoxylated coconut diethanolamides with respect to water in the fluid, having an ethoxylation ratio of 6.

Under these conditions, we observe that the temperature at which hydrates start to form is 9.9° C. and that the temeprature at which blockage of the loop occurs is −1° C.

EXAMPLE n° 6

We proceed as in example n° 1 but we add to the circulating fluid 0.2% in weight of rapeseed oil diethanolamides with respect to water.

Under these conditions, we observe that the temperature at which hydrates start to form is 8.3° C. and that at −5° C., no blocking of fluid circulation is produced. A typical composition of acids present in rapeseed oil, essentially in the form of glycerides, is as follows:
5.9% hexdecanoic (C16:0),
1.8% octadecanoic (C18:0),
0.5% eicosanoic (C20:0),
0.2% docosanoic (C22:0),
0.3% hexadecenoic (C16:1),
56.5% octadecenoic (C18:1),
24.2% linoleic (C18:2),
8.9% octadecatrienoic (C18:3),
1.1% eicosenoic (C20:1),
0.6% docosenoic (C22:1).

EXAMPLE n° 7

We proceed as in example n° 1 but we add to the circulating fluid 0.3% in weight of suet diethanolamides with respect to water.

Under these conditions, we observe that the temperature at which hydrates start to form is 8.1° C. and that no blockage of fluid circulation occurs until a temperature of −5° C.

A typical composition of the acids present in suet oil in the form of triglycerides is as follows:
26% hexdecanoic (C16:0),
23% octadecanoic (C18:0),
35% octadecenoic (C18:1),
2.4% octadecadienoic (C18:2),
5% acids comprising less than 16 carbon atoms.

EXAMPLE n° 8

We proceed as in example n° 1 but we add to the circulating fluid 400 ppm in weight of butter diethanolamides with respect to water.

Under these conditions, we observe that the temperature at which hydrates start to form is 10° C. and that blocking of fluid circulation occurs at +3° C.

Analysis of the compound comprising butter diethanolamides, obtained from diethanolamine and methyl esters of butter, is as follows:
5.3% diethanolamine,
5% butanoic acid diethanolamide (C4:0),
2.7% hexanoic acid diethanolamide (C6:0),
1.6% octanoic acid diethanolamide (C8:0),
3.7% decanoic acid diethanolamide (C10:0),
3.7% dodecanoic acid diethanolamide (C12:0), 11.5% tetradecanoic acid diethanolamide (C14:0),
30.7% hexadecanoic acid diethanolamide (C16:0),
24% octadecanoic acid diethanolamide (C18:0),
2% methyl esters of butter (not reacted) and the remainder essentially consisting of diethanolamides of various acids contained in butter

EXAMPLE n° 9

We proceed as in example n° 1 but we add to the circulating fluid 0.1% in weight with respect to water of a mixture of 95% in weight of butter diethanolamides and 5% in weight of sodium dioctylsulfosuccinate at a concentration of 65%.

Under these conditions, we observe that the temperature of hydrate formation is 9.8° C. and that the temperature at which there is blockage of fluid circulation is +2.7° C.

EXAMPLE n° 10

We proceed as in example n° 1 but we add to the circulating fluid 0.1% in weight, with respect to water, of the diethanolamide of ricinoleic acid estolide. The average molecular weight of this estolide is around 700.

Under these conditions, we observe that the temperature at which hydrates start to form is 9.3° C. and that the temperature at which there is blockage of fluid circulation is 0.5° C.

In examples 1 and 2, in the presence of methanol only or with the fluid to be tested only, we observe that blockage of the loop occurs very soon after the formation of hydrates starts, that is, 0.4° C. below the temperature at which formation of hydrates starts, that is, 24 minutes after having reached this temperature, the time necessary for coalescence and growth of hydrates to occur.

On the other hand, when mono and diethanolamides are used, we observe that the temperature at which blockage of fluid circulation occurs is very much lower than the temperature at which formation of hydrates starts and that a much longer period of time is needed to obtain blockage, even with a very low additive concentration (0.1%) (examples 3 and 3a) and that at higher concentrations, no blockage due hydrate formation occurs (examples 4 and 4a), even after a very long period of time.

The beneficial effect of adding sodium dioctylsulfosuccinate, an anionic amphiphilic compound, to a non-ionic amphiphilic compound consists of substantially reducing the temperature at which formation of hydrates starts and in, particular, the temperature at which blockage of circulation of the fluid occurs. Examples 8 and 9 show that addition of sodium dioctylsulfosuccinate to butter diethanol ethanolamides reduces the temperature at which hydrates start to form by 0.2° C. and the blockage temperature by 0.3° C.

What is claimed is:

1. Process for delaying the formation and/or reducing the agglomeration tendency of hydrates within a fluid comprising water and a gas, in conditions under which hydrates can be formed, the hydrates being formed from water and gas, wherein an additive comprising at least one non-ionic amphiphilic compound is incorporated into said fluid.
2. Process according to claim 1 wherein said non-ionic amphiphilic compound is an amide compound.
3. Process according to claim 2 wherein said amide compound is a hydroxylated compound chosen from the group consisting of carboxylic acid hydrocarbylamides, amino acid hydrocarbylamides, such as peptides, and sulfonic acid hydrocarbylamides.
4. Process according to claim 1 wherein said compound is mono or polyalkoxylated.
5. Process according to claim 2 wherein said amide compound is chosen from dihydroxycarbylamides and N,N dihydroxycarbylamides of carboxylic acids.
6. Process according to claim 3 wherein said carboxylic acids are linear, saturated or unsaturated acids derived from vegetable and animal oils and fats.
7. Process according to claim 3, wherein the carboxylic acids are hydroxycarboxylic such as ricinoleic acid.
8. Process according to claim 3, wherein the carboxylic acids are estolides, such as ricinoleic acid estolides.
9. Process according to claim 1, wherein the carboxylic acids are epoxycarboxylic acids, such as epoxystearic acid.
10. Process according to claim 1, wherein the hydroxycarbylamides are aliphatic hydroxycarbylamides.
11. Process according to claim 1, wherein the hydroxycarbylamides are ethoxylated mono and diethanolamides whose ethoxylation ratio is from 1 to 20.
12. Process according to claim 3, wherein the carboxylic acid comprises 3 to 36 carbon atoms and preferably 8 to 20 carbon atoms.
13. Process according to claim 1, wherein said additive moreover comprises an alcohol, such as methanol.
14. Process according to claim 1, wherein said additive moreover comprises an anionic surfactant compound.

* * * * *